(12) United States Patent
Unno (10) Patent No.: US 7,980,810 B2
(45) Date of Patent: Jul. 19, 2011

(54) VERTICAL AXIS WINDMILL AND WIND TURBINE SYSTEM FOR GENERATING ELECTRICITY FROM WIND ENERGY

(75) Inventor: Yuji Unno, Tokyo (JP)

(73) Assignee: Seabell International Co. Ltd., Tokyo (JP)

( * ) Notice: Subject to any disclaimer, the term of this patent is extended or adjusted under 35 U.S.C. 154(b) by 1027 days.

(21) Appl. No.: 11/779,028

(22) Filed: Jul. 17, 2007

(65) Prior Publication Data

US 2008/0213083 A1    Sep. 4, 2008

Related U.S. Application Data

(60) Provisional application No. 60/940,744, filed on May 30, 2007.

(30) Foreign Application Priority Data

Jan. 10, 2007  (JP) ................................. 2007-002771

(51) Int. Cl.
*F03D 3/02*   (2006.01)
(52) U.S. Cl. ............................ 415/4.2; 416/23; 416/140
(58) Field of Classification Search ................... 415/4.2, 415/4.4, 907; 416/9, 14, 23, 132 B, 140
See application file for complete search history.

(56) References Cited

FOREIGN PATENT DOCUMENTS
JP        55153870 A  * 12/1980
* cited by examiner

*Primary Examiner* — Edward Look
*Assistant Examiner* — Dwayne J White
(74) *Attorney, Agent, or Firm* — Hodgson Russ LLP

(57) ABSTRACT

A lift-type wind turbine having a substantially vertical rotating shaft and a plurality of substantially vertical blades secured to the shaft. Each blade includes a front portion, a rear portion, and a pivot axis pivotally securing the rear and front portions. The rear portion pivots relative the front portion. The blades additionally include bottom and top edges positioned on each of the front portions. Each bottom edge is arranged substantially equidistant from the shaft proximate a first circumference extending substantially horizontally about the shaft, whereas each top edge is arranged substantially equidistant from the shaft proximate a second circumference extending substantially horizontally about the shaft. The blades are angled relative to the rotating shaft. The blades have an open, drag means position as well as a closed, lift means position, and passively switch between the positions based on wind speed for efficient rotation.

18 Claims, 10 Drawing Sheets

VERTICAL AXIS WINDMILL AND WIND TURBINE SYSTEM FOR GENERATING ELECTRICITY FROM WIND ENERGY

CROSS REFERENCE TO RELATED APPLICATIONS

This application claims priority to U.S. Provisional Application No. 60/940,744, filed May 30, 2007, which is incorporated herein by reference, and this application claims priority to Japanese Patent Application No. 2007-2771, filed Jan. 10, 2007.

FIELD OF THE INVENTION

The invention is related to wind turbine systems and windmills that utilize improved blade designs, specifically to vertical axis wind turbines.

BACKGROUND OF THE INVENTION

Windmill and wind turbine systems are generally either horizontal axis systems where the rotating shaft is arranged in a horizontal direction, or vertical axis where the rotating shaft is arranged in a vertical direction.

Vertical axis wind turbines rotate in the same position irrespective of wind direction whereas horizontal axis wind turbines must be positioned to face the wind direction in order to rotate. Vertical axis wind turbines also rotate with relatively silent movement and fit into most landscapes. For these reasons, vertical axis wind turbines are generally considered better suited for urban use when compared to horizontal axis wind turbines.

Vertical axis wind turbines are generally available in two varieties, drag or lift. The drag variety utilizes drag created by the blades for rotation. To this end the blades can be arranged as paddles or as a Savonius design. The lift variety utilizes lift created by the blades for rotation. Blade shape arrangements for lift variety wind turbines are apparent in a Darrius (also spelled Darrieus) or gyromill design, and often resemble the shape of aircraft airfoils.

For vertical axis drag type wind turbines, when the speed of a tip of a blade reaches wind speed, i.e. when tip speed ratio equals 1 (TSR=1), no more force can be applied to the blade. Thus, wind turbine rotation is limited since the blade speed is limited to wind speed thereby limiting the electricity generation capabilities of the wind turbine.

For vertical axis lift type wind turbines, however, the speed of a tip of a blade can exceed wind speed. Specifically, TSR can exceed and is preferably greater than 1. At these speeds, the wind turbine can generate a high level of electricity, but the aerodynamics of the blades are usually inefficient when blade speed is below wind speed, i.e. when TSR<1. Thus, a vertical axis lift wind turbine only generates substantial amounts of electricity when TSR>1. Moreover, in low wind speed environments, blade aerodynamics are inefficient and cannot produce enough torque to initiate rotation, and the wind turbine usually requires a separate power source to initiate rotation.

To compensate for the deficiencies of vertical axis lift wind turbines, additional components are generally added to facilitate initial rotation. For example, components like that of the Savonius design may be attached on the same axis of the vertical axis wind turbine to increase startup torque and improve startup efficiency. However, adding components like that of the Savonius design increases the number of parts, raises production costs and increases design complexity. Moreover, in high wind speed environments, the added components cause drag and resistance to the rotation of the wind turbine, lowering the efficiency of the wind turbine.

Another method of improving vertical wind turbine designs is to include concaved curves behind the blades similar to that of a Savonius design. The supporting point of the blade in relation to the vertical shaft is shifted 10-30% to the front or the back from the center point, and the angle of the supporting arm of the blades to the shaft is kept constant by utilizing springs. Although this arrangement creates enough start up torque by generating drag in low wind speeds, in high wind speeds the same concaved curves produce vortexes that lower wind turbine efficiency. Additionally, especially if the wind turbine is susceptible to rain or moisture, the springs necessary for the system to support the angle of the blade in relation to the shaft can deteriorate and break.

An additional improvement to wind turbine designs, specifically to improving rotational efficiency, includes new blade shape designs. Specifically, the blade surface that faces the shaft remains separated at the back edge. Since it has no concaved curve like that of a Savonius design, there still exists the issue of inadequate torque to initiate rotation prior to TSR reaching 1.

As discussed above, in a drag type vertical axis wind turbine, wind turbine rotation is limited to TSR=1, limiting electricity generation. When TSR>1, lift type vertical axis wind turbines are efficient, but when the TSR<1, the aerodynamics are inefficient and the aerodynamics are inadequate to produce enough startup torque to initiate wind turbine rotation, necessitating a secondary power source to begin rotation.

Accordingly, there is a need for a wind turbine to solve the issues that have been described above that will eliminate inadequate torque at startup with the lift type vertical axis wind turbine while maintaining efficient electricity generation at high rotation speeds, and allow TSR to exceed 1. Stated alternatively, what is needed is a wind turbine that operates efficiently throughout TSR<1 to TSR>1 to accommodate varying wind speed conditions.

SUMMARY OF THE INVENTION

The present invention broadly comprises lift-type wind turbines having a substantially vertical rotating shaft, a plurality of substantially vertical blades fixedly secured to the shaft, each of the blades further including a front portion, a rear portion, and a pivot axis pivotally securing the rear portion to the front portion. The rear portion is operatively arranged to pivot relative the front portion. The blades additionally include bottom edges positioned on each of the front portions. Each of the bottom edges is arranged substantially equidistant from the shaft proximate a first circumference extending substantially horizontally about the shaft. The blades further include top edges positioned on each of the front portions. Each of the top edges is arranged substantially equidistant from the shaft proximate a second circumference extending substantially horizontally about the shaft. The second circumference is smaller than the first circumference. In a secondary embodiment, the second circumference is larger than the first circumference.

The front portion further includes a rear cover operatively arranged to at least partially cover an outer surface of the rear portion. The rear cover is an extension of an outer surface of the front portion and extends beyond the pivot axis connection between front and rear portions. The rear cover is operatively arranged to cover at least about 30% to 100% of a width of a leading edge of the rear portion. The rear portion may be operatively arranged in an open position when pivoted about 20 degrees to about 45 degrees relative the rear cover.

In most embodiments, the front and rear portions are operatively arranged to vary between a drag means position and a lift means position relative wind speed. The drag means position is associated with low wind speeds and tip speed ratios of about 0 to about 1. The lift means position is associated with high wind speeds and tip speed ratios of about at least 1. The front and rear portions may be operatively arranged as an aerodynamic shape when a tip speed ratio is greater than about 1. Specifically, the lift means position is substantially similar to an airfoil shape.

In most embodiments, the wind turbines further include a motor connected to the rotating shaft. The motor is vertically coaxed below the vertical shaft.

The wind turbine blades are spaced substantially equally apart about the rotating shaft. There are about three to about five blades.

In other embodiments the pivot axis that pivotally secures the rear portion to the front portion of the blades is positioned about 50% to 70% of a chord length of the blades measured from a leading edge to a trailing edge of the blades.

Also in other embodiments, the blades further include a stopper positioned proximate said pivot axis and operatively arranged to limit a pivot angle of the rear portion. The stopper limits the pivot angle to about 0 degrees in a closed position and is limited to about 20 degrees in an open position, wherein the pivot angle is measured relative a trailing end direction of a chord length of the blades. Alternatively, the stopper can be arranged to limit the pivot angle to about 45 degrees in an open position.

In other embodiments, the stopper is arranged to dampen the pivoting movement of the rear portion.

Thus, this wind turbine design can be effective in a situation where the TSR is below 1 or above 1.

It is a primary objective of the present invention to provide a wind turbine where, relative to the wind speed, the rotation moment due to lift from front wind currents, and the rotation moment due to drag from rear or diagonally rear wind currents can both be generated. Thus, in an environment where wind speed and the wind direction are constantly changing, the wind turbine can continuously rotate and efficiently generate electricity.

It is another objective of the present invention to provide a simplistic design of small to medium size that can be produced at relatively low cost using low or easy maintenance components.

It is also an objective of the present invention to provide a low-cost electricity generation solution that can be installed anywhere with relative ease and can be applied to homes, schools, factories, offices, and remote locations that have high electricity delivery costs such as parks, meadows, ravines and islands.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Like drawing numbers on different figures identify identical or functionally similar structural features of the invention. The invention is not limited to the particular methodology, materials and modifications described and as such may, of course, vary. The terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs.

Figure 1:
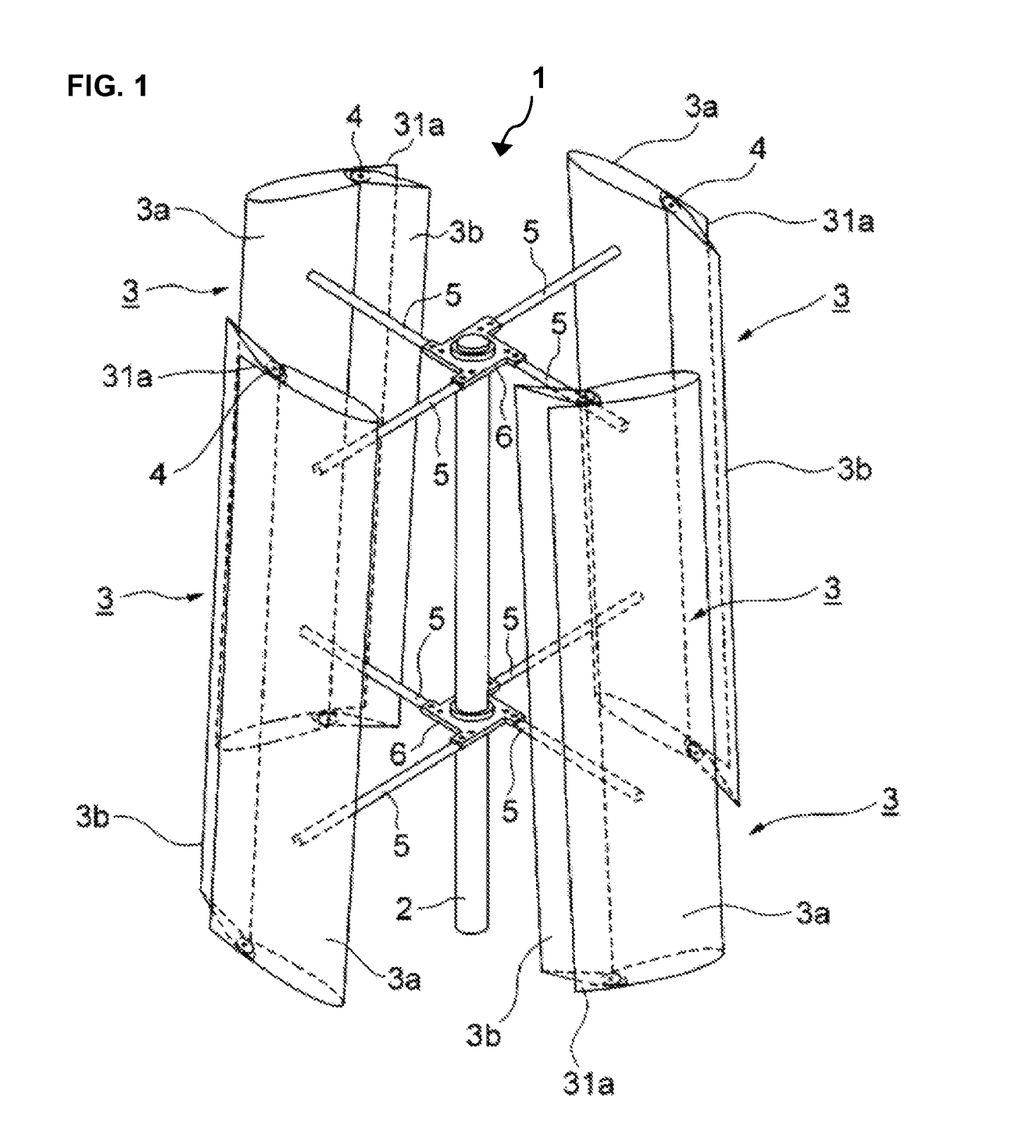
FIG. 1 is a perspective view of a wind turbine in accordance with the present invention.

FIG. 1 depicts the overall structure of wind turbine 1, which is a wind turbine in accordance with the present invention. Wind turbine 1 is shown arranged with a substantially vertical rotating shaft 2 fixedly secured to four blades 3. Blades 3 include front portions or front blades 3a and rear portions or rear blades 3b. Front portions 3a and rear portions 3b are fixedly secured to each other by means of pivot axis 4. In FIG. 1, rear portions 3b are portrayed in a partially open position that produces drag as will be discussed in detail infra.

Blades 3 are fixedly secured to shaft 2 by means of support arms 5 at hubs 6. A combination or welding, bolting and riveting can be used to fixedly secure the above-mentioned elements dependent upon choice of material, which can vary from plastics, composites and fiberglass to metals such as aluminum and stainless steel. To increase resistance to environmental factors, wind turbine 1 can also be painted or coated.

Figure 2:
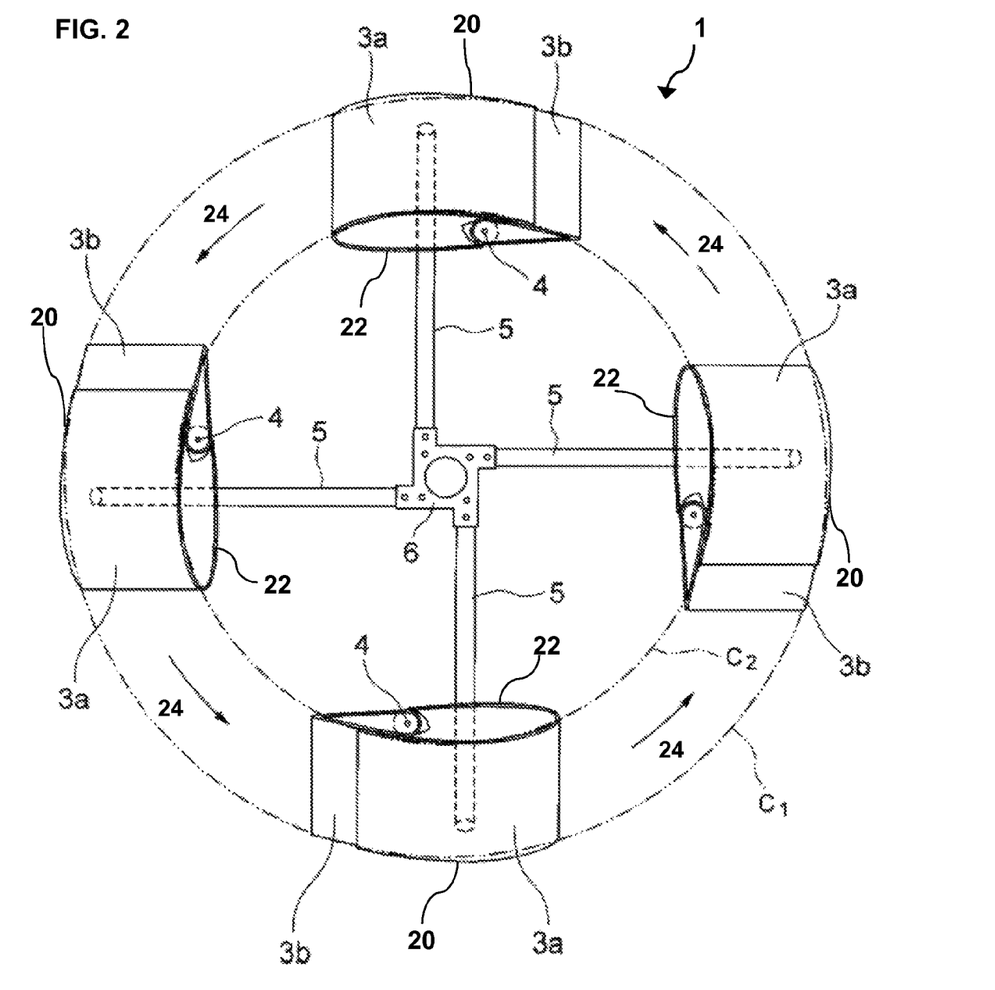
FIG. 2 is a top plan view of the wind turbine shown in FIG. 1.

FIG. 2 depicts wind turbine 1 from the top with rear portions 3b shown in a closed position. FIG. 2 best illustrates the slightly tilted arrangement of blades 3. Bottom edges 20 of front portions 3a are arranged proximate circumference C1. Top edges 22 of front portions 3a are arranged proximate circumference C2. As is illustrated in the figures, circumference C2 is smaller than circumference C1. This tilting arrangement allows gravity to assist rear portions 3b to tilt inward and downward, towards an open position as is illustrated in FIG. 1. In order for rear portions 3b to close to the closed position shown in FIG. 2, a sufficient rotational speed of wind turbine 1 must first be achieved to establish an outward centrifugal force that overcomes the downward and inward gravitational force exerted on rear portions 3b. It should be appreciated that the specific spatial proportion of circumferences C1 and C2 vary depending on, amongst various other factors, blade weight, alignment and overall structural sizes. The embodiment illustrated in FIG. 4 depicts blades 3 rotating with sufficient speed in the direction of arrows 24 to completely close rear portions 3b.

It should be readily appreciated that the embodiment shown in the figures is only a primary embodiment and that the rotational direction of arrows 24 is only preferred. It should be readily appreciated that the direction of rotation can be changed by simply reversing the direction blades 3, ensuring appropriate airfoil shape for lift generation.

Figure 3:
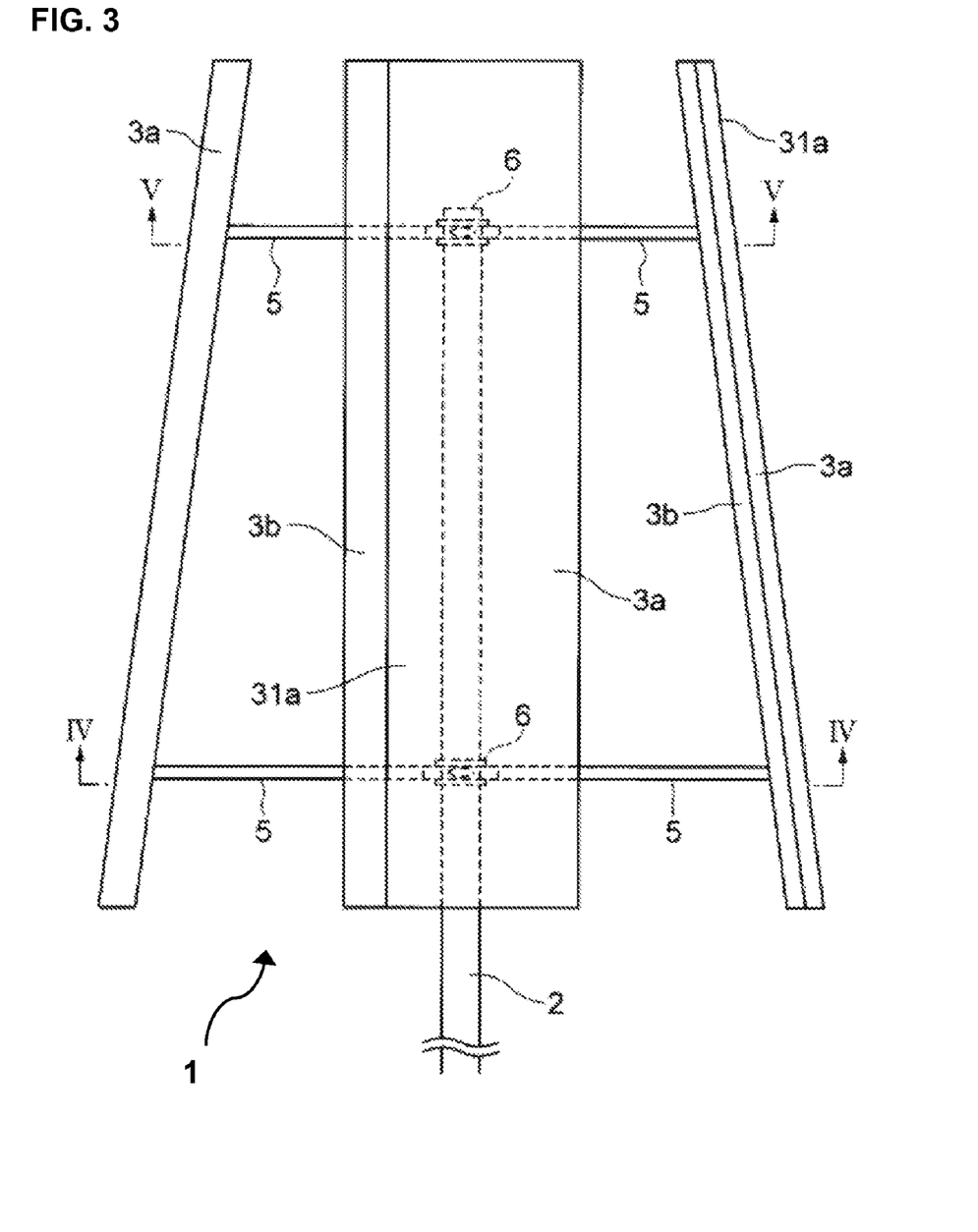
FIG. 3 is an elevated view from the front of the wind turbine shown in FIG. 2.

FIG. 3 is a front view of wind turbine 1 as illustrated in FIG. 2. FIG. 3 further illustrates the tilted positional arrangement of blades 3.

Figure 4:
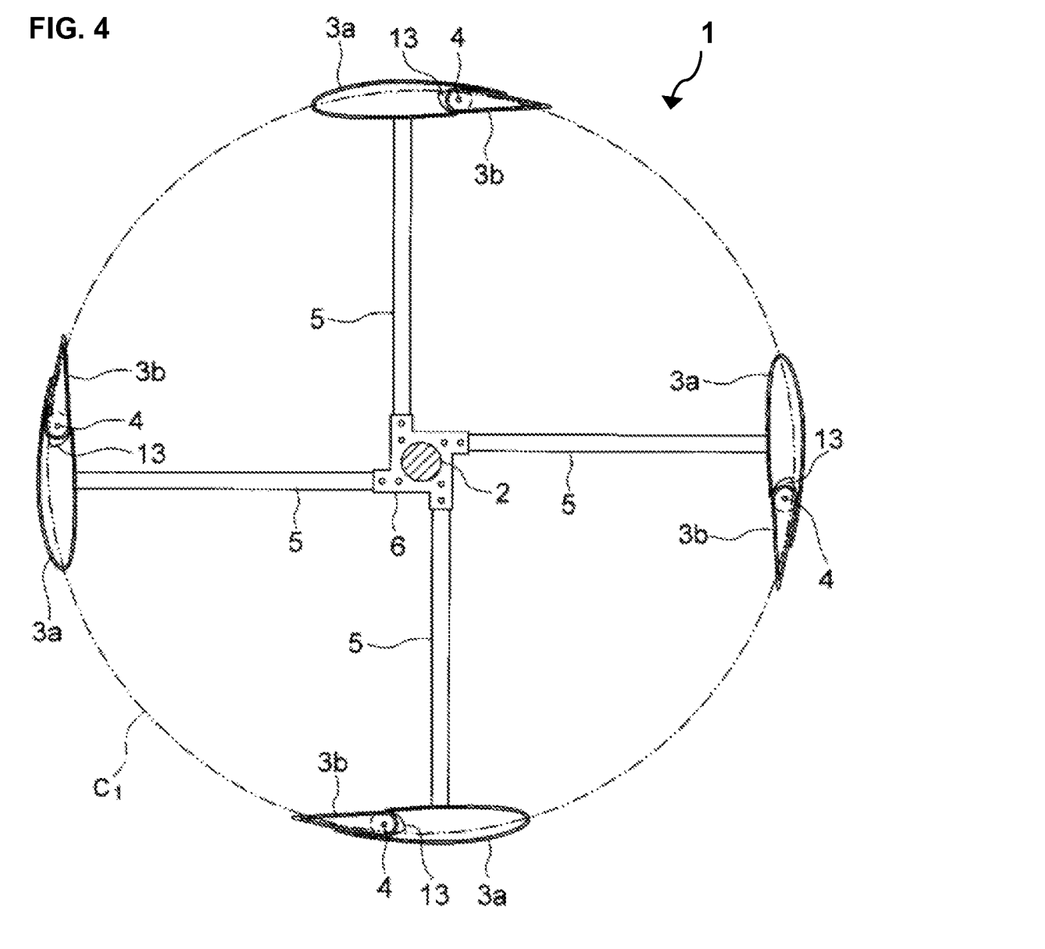
FIG. 4 is a cross-sectional view taken substantially along line IV-IV of FIG. 3.
Figure 5:
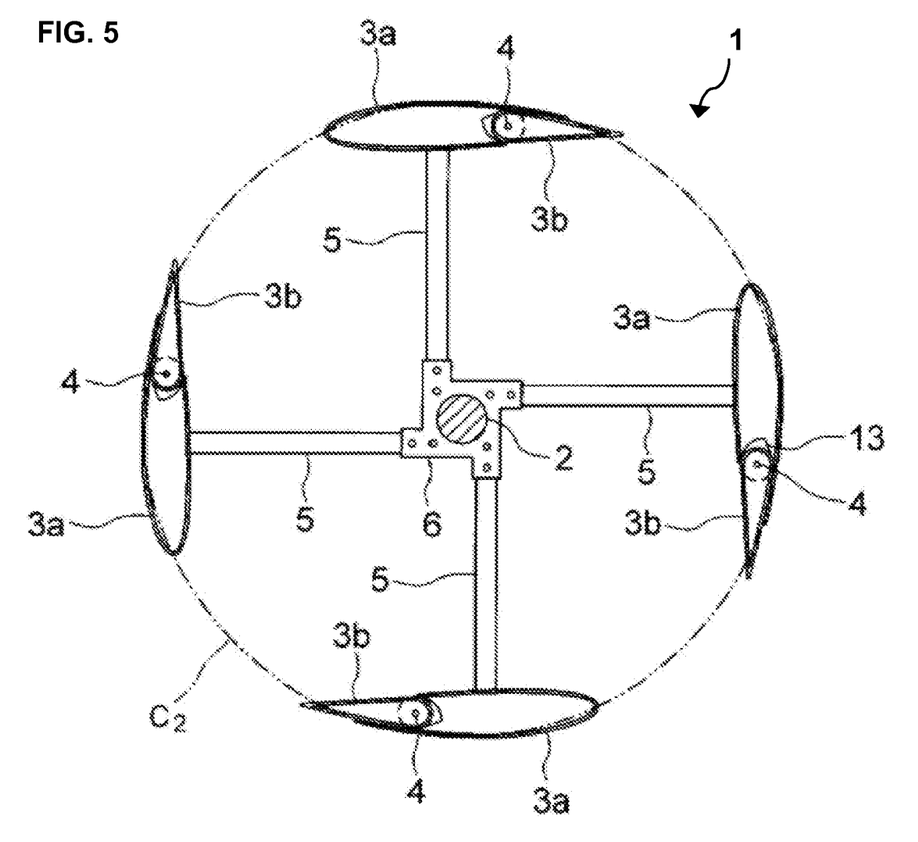
FIG. 5 is a cross-sectional view taken substantially along line V-V of FIG. 3.

FIG. 4 is a cross-sectional view taken substantially along line IV-IV of FIG. 3. FIG. 5 is a cross-sectional view taken substantially along line V-V of FIG. 3.

Figure 6:
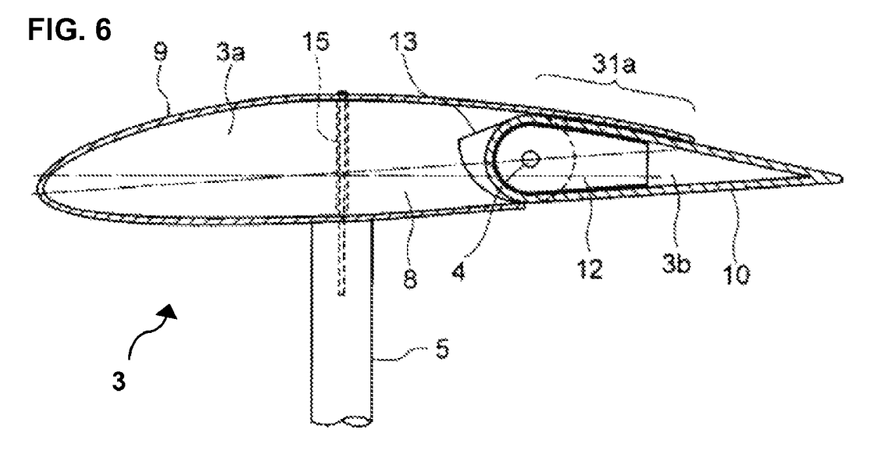
FIG. 6 is an enlarged cross-sectional view of a blade of the wind turbine of the present invention.

FIG. 6 is an magnified view of the cross-section of blade 3 as illustrated in FIG. 5. FIG. 6 more clearly depicts front portion 3a pivotally secured to rear portion 3b by means of pivot axis 4. Front portion 3a is secured to arm 5 by means of bolt 15. Most clearly depicted in FIG. 6 is stopper 13, which is arranged proximate pivot axis 4 and is arranged to limit the pivot angle of rear portion 3b. In addition to stopper 13, rear cover 31a provides additional support to rear portion 3b by limiting the pivot of rear portion 3b to a streamlined, substantially airfoil shape and prevent rear portion 3b from overextending (not shown). Blade 3 further includes rib material 12 that is included into blade 3 so as to strengthen and stiffen blade 3.

The chord, the distance between the leading edge (LE) to the trailing edge (TE), of blade 3 is most clearly shown in FIG. 6. Preferably, front portion 3a constitutes about 50%-70% of the chord length whereas rear portion 3b constitutes the remainder. However, it should be readily appreciated that it is preferred that rear cover 31a is preferably a trailing edge extension of front portion 3a that extends beyond the leading edge of rear portion 3b. Preferably, rear cover 31a covers about 30%-100% of rear portion 3b. Most preferably, rear cover 31a covers about 50-70% of rear portion 3b. The length and coverage of rear cover 31a is preferably selectively chosen such that the centrifugal force acting upon rear portion 3b is greater than the drag force exerted upon the outward surface of rear portion 3b at a pre-determined wind turbine rotational speed.

FIGS. 2-6 depict blades 3 in a closed position. Specifically, rear portion 3b is closed substantially against rear cover 31a or, stated alternatively, at a 0 degree pivot angle. FIG. 1 depicts blades 3 in an open position. The open position includes a range of pivot angles up to about 20 to about 60 degrees, measured relative the closed position. Pivot angles within the range of about 30 to 45 degrees are preferred. The angle can also be measured from the angle created between rear cover 31a and rear portion 3b. The structural arrangement of stopper 13 directly controls the pivot angle range of the open position shown in FIG. 1.

Figure 7:
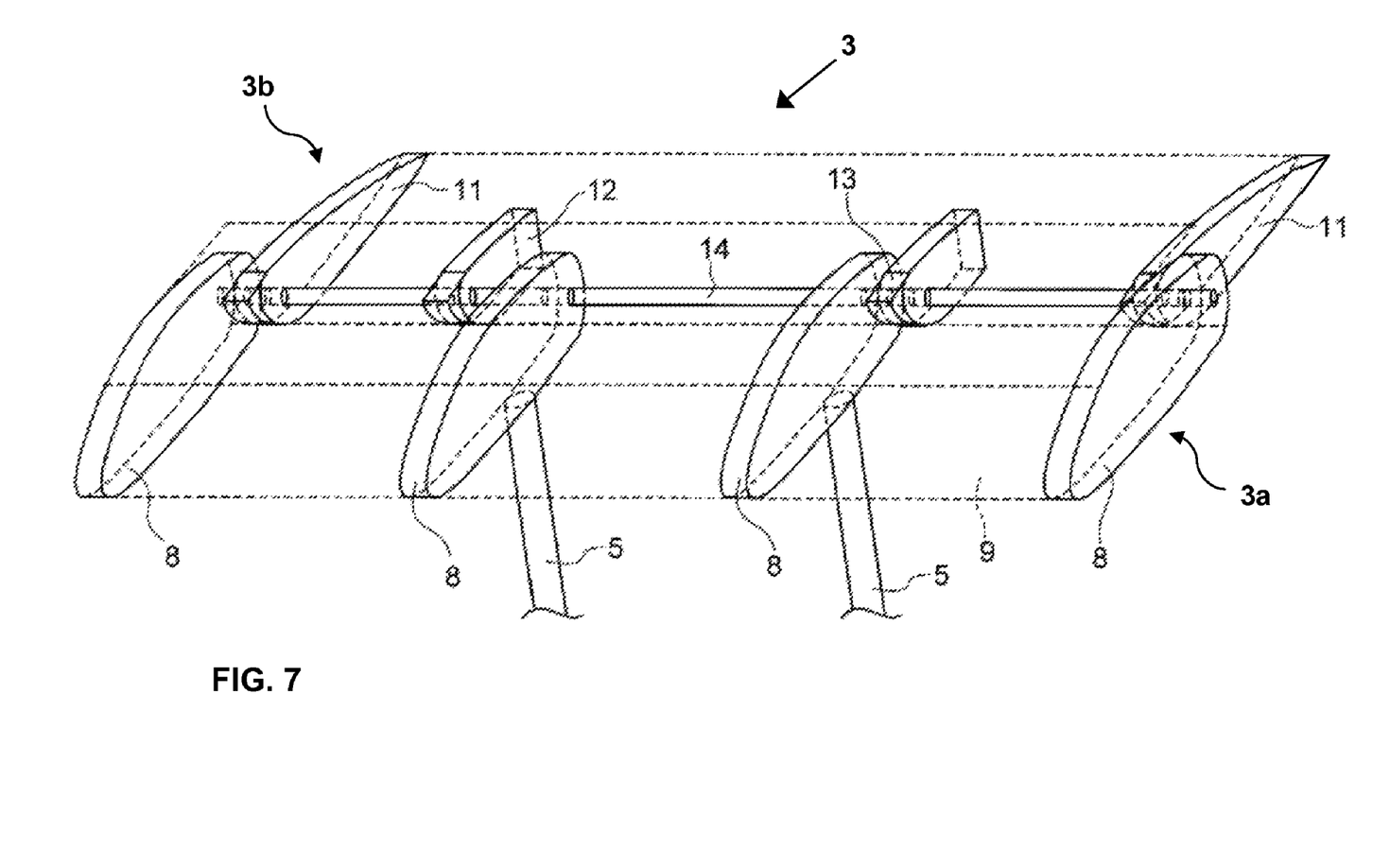
FIG. 7 is a perspective cut away view of a wind turbine blade according to the present invention, depicting the blade rib structure.
Figure 8:
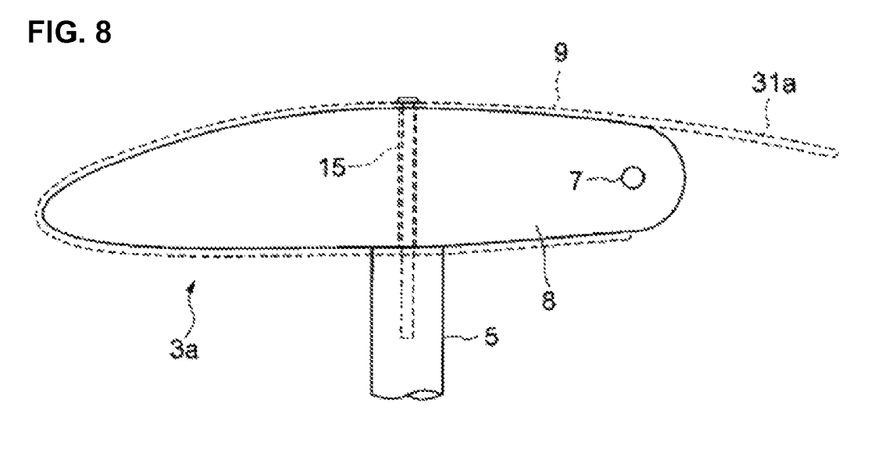
FIG. 8 is a cross sectional view of the rib structure for the front portion of the blade shown in FIG. 7.
Figure 9:
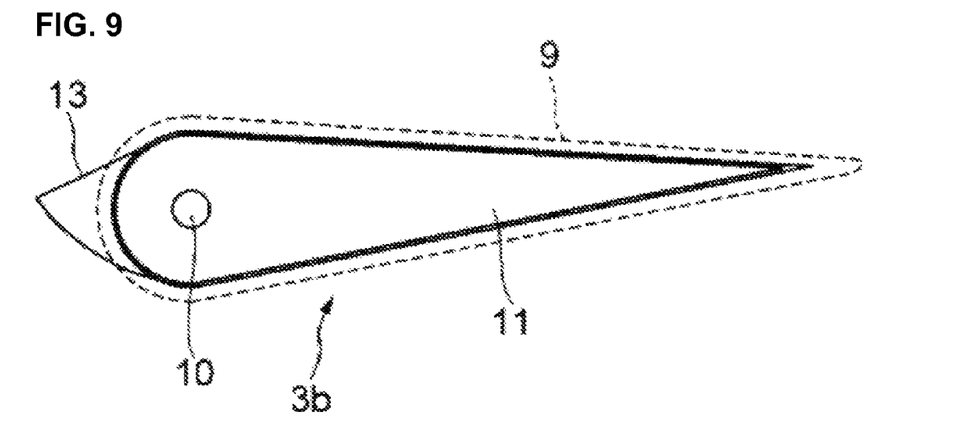
FIG. 9 is a cross sectional view of the rib structure for the rear portion of the blade shown in FIG. 7.

FIGS. 7-9 best depict the construction of blades 3. FIG. 7 best illustrates pivot axis 4 positioned within blade 3 between front portion 3a and rear portion 3b. Ribs 8, 11 and 12 are structurally arranged to give shape to the outer structure of blades 3. Ribs 8, 11 and 12 may be aluminum alloy or plastic and are covered by a thin and light material such as an aluminum alloy, fiber reinforced plastic, fiber glass, or a composite material to complete the outer structure of the blade. The outer structure can then be riveted, bolted or welded, depending on material choice to ribs 8, 11 and 12. Since blades 3 are similar to structure to aircraft wings, any suitable material or manufacturing methods in manufacturing aircraft wings could be applied to fabricating blades 3.

Figure 10:
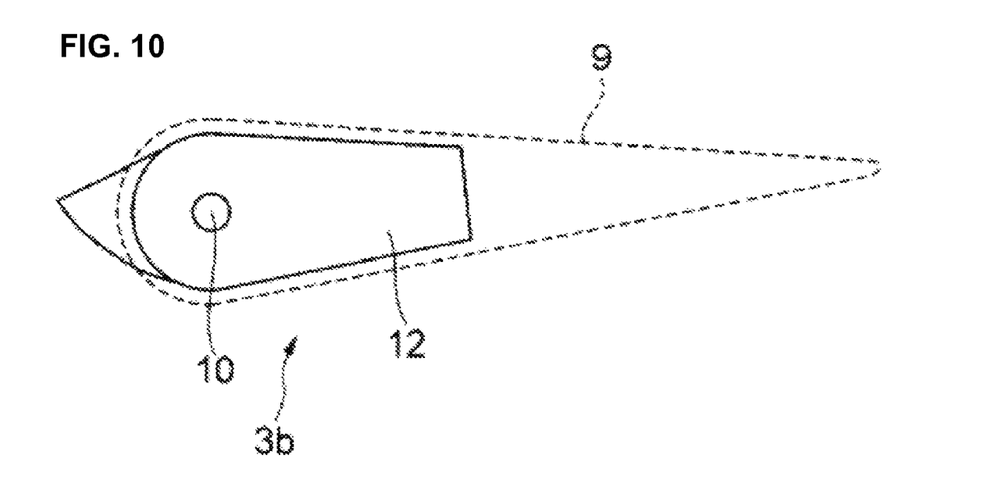
FIG. 10 is a cross sectional view of a secondary rib structure for the rear portion of the blade shown in FIG. 7.

Stopper 13, as best described in reference to FIGS. 7 and 9-10, is covered with, not shown, or made from a resilient but flexible material so as to prevent damage from repeatedly pressing against the inner surface of front portion 3a during regular operation.

Turning to FIGS. 8-10, pivot axis 4 is arranged to pass through holes 7 and 10 of respective front portions 3a and rear portions 3b. Hole 10 of rear portion 3b is located about 20-30% to the front of the center of gravity of rear portion 3b.

Shaft 2 may be connected coaxially via a transmission, not shown, to any electric generator or other engine that can convert the rotational motion into a useful purpose. Although wind turbine 1 is illustrated as having four blades, it should be appreciated that this is only one example. Wind turbine 1 has about three to about five blades, but can be designed with any number of blades suitable for a specific application.

Returning to FIGS. 2-3, a secondary embodiment of the invention, not shown, can be achieved where circumference C2 is larger than circumference C1. Stated alternatively, instead of an overall cone-shaped wind turbine where the base area is larger than the topmost area as illustrated in the figures, a secondary embodiment can be readily appreciated where the wind turbine has a shape where the base area is smaller than the topmost area.

In this secondary embodiment, the general structure of blades 3 is mirrored. Specifically, rear cover 31a, instead of being arranged on the outside surface of blades 3, is arranged on the inside surface of blades 3. Also, rear portion 3b, instead of being arranged to pivot inwards, is arranged to pivot outwards. Effectively, in this secondary embodiment not shown in the figures, blades 3 are tilted outwardly at their respective tops instead of being tilted inwardly at their respective tops.

Moreover, it should be appreciated that a combination of the primary and secondary embodiments can be constructed wherein a secondary embodiment wind turbine can be stacked atop a primary embodiment wind turbine, each sharing a rotational shaft 2.

Figure 11:
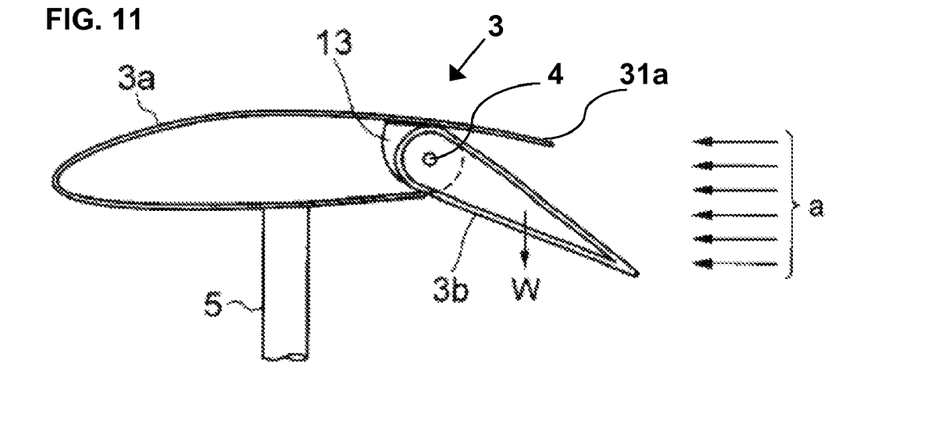
FIG. 11 is a partial cross sectional view of the blade of a wind turbine according to invention in an open position.
Figure 12:
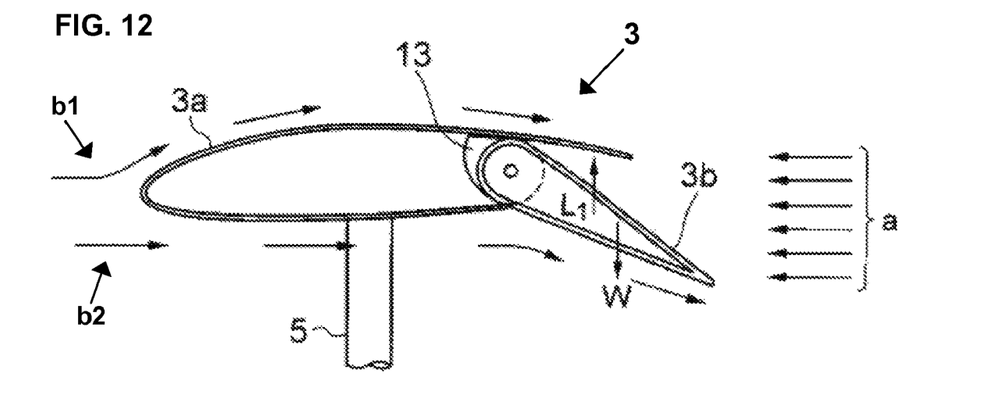
FIG. 12 illustrates lift generation as the blade shown in FIG. 11 starts to rotate.
Figure 13:
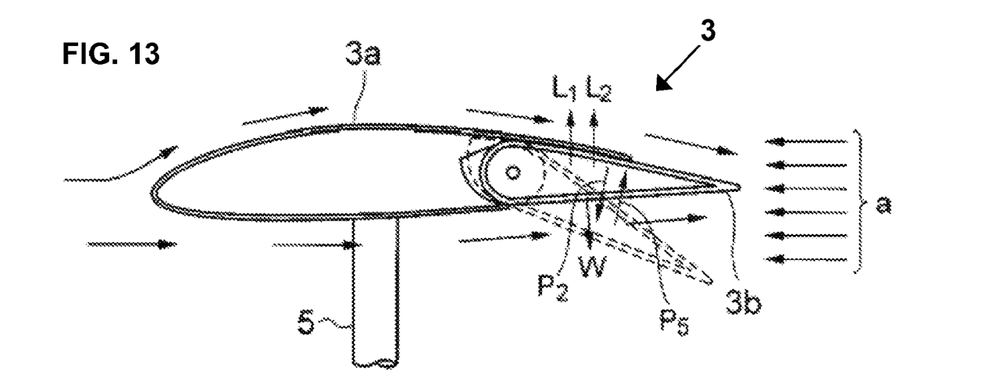
FIG. 13 illustrates the blade shown in FIG. 11 closing from increased blade rotation speed, causing the rear portion to engage the rear cover; and, FIG. 14 illustrates drag being generated from rear wind currents for a wind turbine in accordance with the present invention.

The nature and operation of the invention will now be detailed with reference to FIGS. 11-14. FIGS. 11-13 illustrate progressive stages of wind turbine 1, specifically blade 3 from start-up to high rotation.

FIG. 11 depicts rear portion 3b in a fully open position where stopper 13 is resting against the interior surface of rear cover 31a. This position is a drag means position wherein wind current 'a' can push against the interior surface of rear cover 31a and the outer surface of rear portion 3b to exert a start-up, rotational torque on wind turbine 1. Rear portion 3b, as previously discussed, is naturally pivoted in the open position shown in FIG. 11 because the center of gravity of rear portion 3b is closer to the trailing edge of rear portion 3b than the pivot point, pivot axis 4. The drag means position shown is similar to that of a Savonius structure and shares similar operational characteristics.

As blade 3 begins to rotate, air streams b1 and b2 begin to flow across the outer and inner surfaces of blade 3, respectively, as illustrated in FIG. 12. As rotational speed increases, or more specifically, as tip speed ratio increases towards 1, centrifugal force L1 of rear portion 3b increases and begins to overcome weight force W of rear portion 3b. Centrifugal force L1 must also overcome the drag created by wind current 'a'. Blade 3 will stably rotate irrespective of the wind strength or direction. When sufficient wind speed is achieved, when tip speed ratio is approaching or about 1, rear portion 3b will be forced into a closed, lift means position as illustrated in FIG. 13.

FIG. 13 depicts rear portion 3b. In addition to centrifugal force L1, lift force L2 is generated as the air stream passes over blade 3, causing rear portion 3b to close and engage rear cover 31a, forming a lift means position similar to a gyromill or Darrius type structure. This position allows for higher rotation efficiency at higher wind speeds. It should be readily appreciated that once wind speed falls below a tip speed ratio of 1, rear portion 3b will begin to return back towards the open position in the direction of arrow P2 and can readily return to the closed position in the direction of arrow P5 as wind speed increases.

Figure 14:
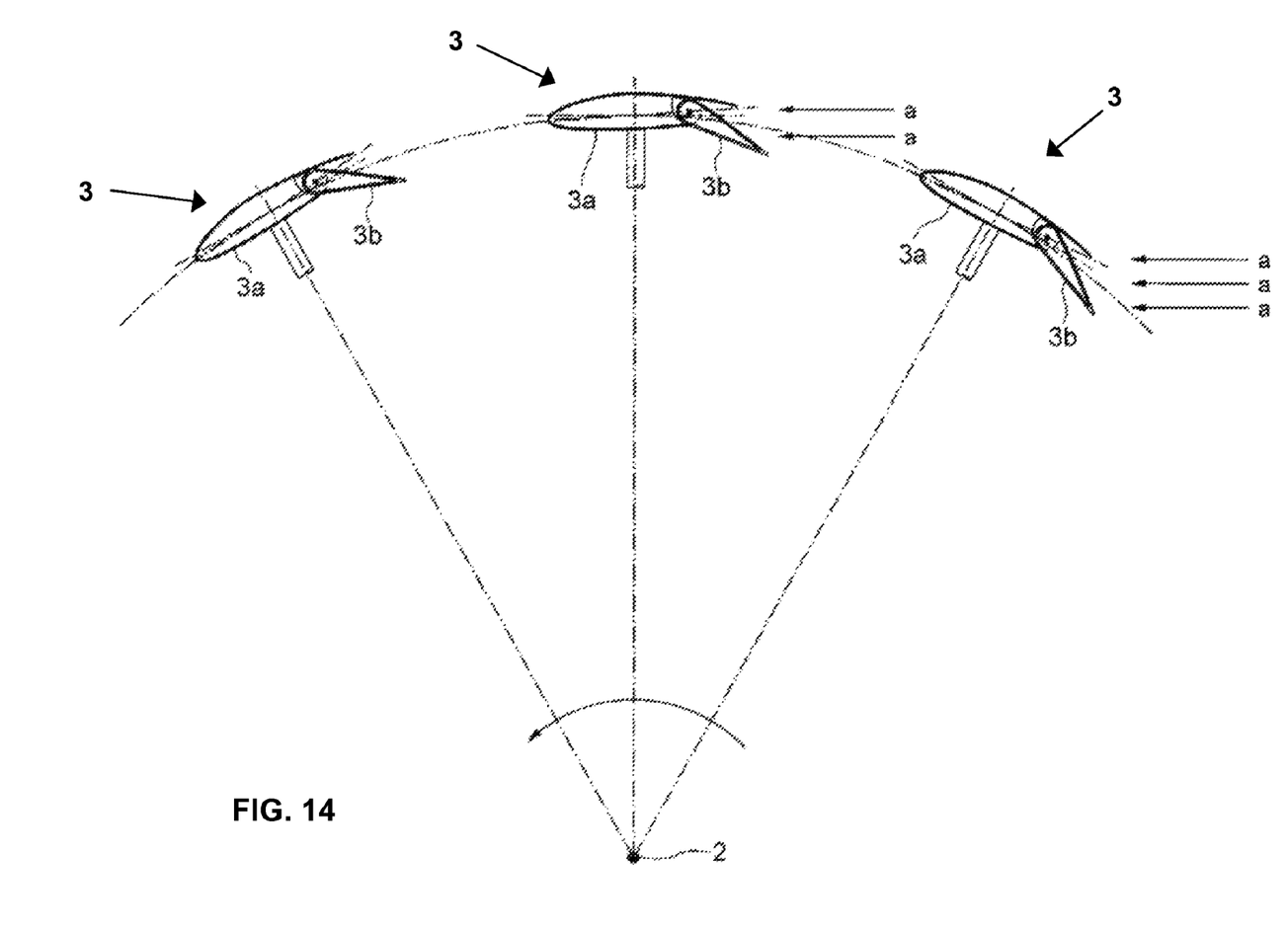

FIG. 14 illustrates blade 3 as wind turbine 1 rotates with drag generated by wind current 'a' from the rear and diagonal rear. The substantially 'V' shaped structure created by front and rear portions 3a and 3b are adequate for interacting with a broad range of rear and diagonally rear wind currents to produce drag and rotational motion.

With this type of wind turbine, when in a low wind speed situation, the rear portion 3b assumes a drag means position similar to that of a Savonius design, thus allowing the wind turbine means to produce enough torque to startup at low winds and operate at wind speeds below a tip speed ratio of 1. The structure of the present invention also enables rear portion 3b to automatically, or passively, change position to a lift means position similar to that of a gyromill, Darrius or airfoil structure, making electricity generation more efficient and allowing efficient rotation and electricity generation greater than a tip speed ratio of 1.

Thus, it is seen that the objects of the present invention are efficiently obtained. Modifications and changes to the invention should be readily apparent to those having ordinary skill in the art, and are intended to be within the spirit and scope of the invention as claimed. It should also be understood that the foregoing description is only merely illustrative of the invention and should not be considered as limiting. Therefore, other embodiments of the invention are possible without departing from the spirit and scope of the invention as claimed.

LEGEND

1 Wind turbine
2 Vertical Rotating Shaft
3 Blade
3a Front Portion
3b Rear Portion
31a Rear Cover
4 Pivot Axis
5 Horizontal Supporting Arms
6 Hub
7, 10 Holes
8, 11-12 Rib Materials
13 Stopper
a Wind Current
b1, b2 Wind Stream

What is claimed is:

1. A lift-type wind turbine, comprising:
a substantially vertical rotating shaft;
a plurality of substantially vertical blades secured to said shaft, each of said blades further comprising a front portion, a rear portion, and a pivot axis pivotally securing said rear portion to said front portion, wherein said rear portion is operatively arranged to pivot relative to said front portion;
bottom edges positioned on each of said front portions, wherein each of said bottom edges is arranged substantially equidistant from said shaft proximate a first circumference extending substantially horizontally about said shaft; and,
top edges positioned on each of said front portions, wherein each of said top edges is arranged substantially equidistant from said shaft proximate a second circumference extending substantially horizontally about said shaft, wherein said second circumference is smaller than said first circumference;
wherein said front portion further comprises a rear cover operatively arranged to at least partially cover an outer surface of said rear portion.

2. A wind turbine according to claim 1, wherein said rear cover is an extension of an outer surface of said front portion and extends beyond said pivot axis.

3. A wind turbine according to claim 1, wherein said rear cover is operatively arranged to cover at least about 30% to 100% of a width of a leading edge of said rear portion.

4. A wind turbine according to claim 1, wherein said rear portion is operatively arranged in an open position pivoted about 20 degrees to about 45 degrees relative said rear cover.

5. A wind turbine according to claim 1, wherein said front and rear portions are operatively arranged to vary between a drag means position and a lift means position relative wind speed.

6. A wind turbine according to claim 5, wherein said drag means position is associated with low wind speeds and tip speed ratios of about 0 to about 1.

7. A wind turbine according to claim 5, wherein said lift means position is associated with high wind speeds and tip speed ratios of about at least 1.

8. A wind turbine according to claim 5, wherein said front and rear portions are operatively arranged as an aerodynamic shape when a tip speed ratio is greater than about 1.

9. A wind turbine according to claim 5, wherein said lift means position is substantially similar to an airfoil shape.

10. A wind turbine according to claim 1, further including a motor connected to said rotating shaft.

11. A wind turbine according to claim 1, wherein said blades are positioned substantially equidistant about said rotating shaft.

12. A wind turbine according to claim 1, said blades comprising about three to about five blades.

13. A wind turbine according to claim 1, further comprising a stopper positioned proximate said pivot axis and operatively arranged to dampen pivoting movement of said rear portion.

14. A lift-type wind turbine, comprising:
a substantially vertical rotating shaft;
a plurality of substantially vertical blades secured to said shaft, each of said blades further comprising a front portion, a rear portion, and a pivot axis pivotally securing said rear portion to said front portion, wherein said rear portion is operatively arranged to pivot relative to said front portion;
bottom edges positioned on each of said front portions, wherein each of said bottom edges is arranged substantially equidistant from said shaft proximate a first circumference extending substantially horizontally about said shaft; and, top edges positioned on each of said front portions, wherein each of said top edges is arranged substantially equidistant from said shaft proximate a second circumference extending substantially horizontally about said shaft, wherein said second circumference is smaller than said first circumference;

wherein said pivot axis pivotally securing said rear portion to said front portion of said blades is positioned about 50% to 70% of a chord length of said blades, measured from a leading edge to a trailing edge of said blades.

15. A lift-type wind turbine, comprising:

a substantially vertical rotating shaft;

a plurality of substantially vertical blades secured to said shaft, each of said blades further comprising a front portion, a rear portion, and a pivot axis pivotally securing said rear portion to said front portion, wherein said rear portion is operatively arranged to pivot relative to said front portion;

bottom edges positioned on each of said front portions, wherein each of said bottom edges is arranged substantially equidistant from said shaft proximate a first circumference extending substantially horizontally about said shaft; and, top edges positioned on each of said front portions, wherein each of said top edges is arranged substantially equidistant from said shaft proximate a second circumference extending substantially horizontally about said shaft, wherein said second circumference is smaller than said first circumference;

a stopper positioned proximate said pivot axis and operatively arranged to limit a pivot angle of said rear portion.

16. A wind turbine according to claim 15, wherein said stopper limits said pivot angle to about 0 degrees in a closed position and is limited to about 20 degrees in an open position, wherein said pivot angle is measured relative a trailing end direction of a chord length of said blades.

17. A wind turbine according to claim 15, wherein said stopper limits said pivot angle to about 0 degrees in a closed position and is limited to about 45 degrees in an open position, wherein said pivot angle is measured relative a trailing end direction of a chord length of said blades.

18. A lift-type wind turbine, comprising:

a substantially vertical rotating shaft;

a plurality of substantially vertical blades secured to said shaft, each of said blades further comprising a front portion, a rear portion, and a pivot axis pivotally securing said rear portion to said front portion, wherein said rear portion is operatively arranged to pivot relative to said front portion;

bottom edges positioned on each of said front portions, wherein each of said bottom edges is arranged substantially equidistant from said shaft proximate a first circumference extending substantially horizontally about said shaft; and, top edges positioned on each of said front portions, wherein each of said top edges is arranged substantially equidistant from said shaft proximate a second circumference extending substantially horizontally about said shaft, wherein said second circumference is larger than said first circumference;

wherein said front portion further comprises a rear cover operatively arranged to at least partially cover an outer surface of said rear portion.

\* \* \* \* \*